United States Patent [19]

Smith

[11] 4,370,995

[45] Feb. 1, 1983

[54] METHOD AND APPARATUS FOR PRENOTCHING A PIPELINE

[75] Inventor: William B. Smith, Berea, Ohio

[73] Assignee: The Pipe Line Development Co., Cleveland, Ohio

[21] Appl. No.: 221,883

[22] Filed: Jan. 2, 1981

[51] Int. Cl.³ .................... F16L 55/00; B23D 21/08
[52] U.S. Cl. ................................ 137/15; 29/413; 30/100; 83/863; 137/318; 138/94
[58] Field of Search .................. 29/413; 137/15, 315, 137/318; 138/94; 30/100; 83/862, 863, 864

[56] References Cited

U.S. PATENT DOCUMENTS

| | | | |
|---|---|---|---|
| 1,130,395 | 3/1915 | Gilmour | 30/100 |
| 3,244,339 | 4/1966 | Carner | 30/100 |
| 3,385,314 | 5/1968 | Thompson | 137/318 |
| 3,703,906 | 11/1972 | Tickett | 137/318 |
| 3,763,559 | 10/1973 | Axbjer | 30/100 |
| 3,833,020 | 9/1974 | Smith | 137/318 |
| 3,863,667 | 2/1975 | Ward | 137/318 |
| 3,943,626 | 3/1976 | Williams | 30/100 |
| 4,177,827 | 12/1979 | Smith et al. | 137/318 |

*Primary Examiner*—George L. Walton
*Attorney, Agent, or Firm*—Pearne, Gordon, Sessions, McCoy & Granger

[57] ABSTRACT

The wall of a pipe is prepared for a subsequent cutting operation by a double-edged shear plate, by cutting axially spaced circumferential notches in such wall with a flexible strand cutter capable of operating in the limited confines of a housing designed in the rectangular pattern of the shear plate. The flexible strand cutter advantageously employs roller cutters on a power transmission type chain which is tensioned against and moved circumferentially over the wall of the pipeline.

10 Claims, 5 Drawing Figures

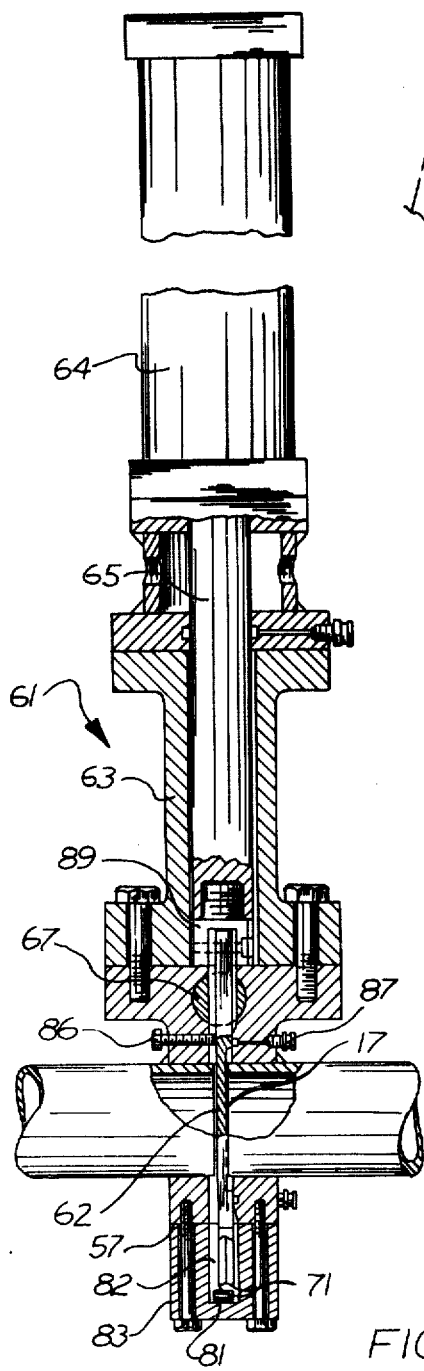
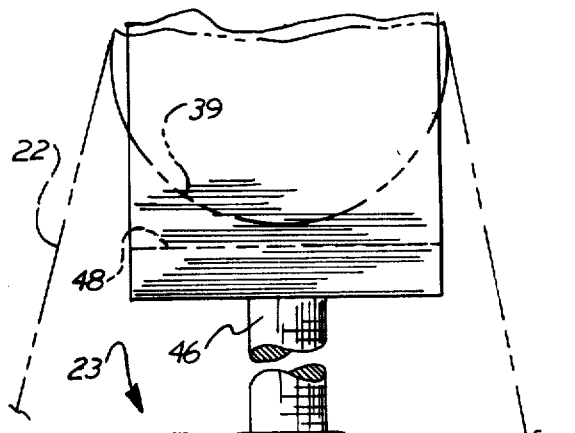
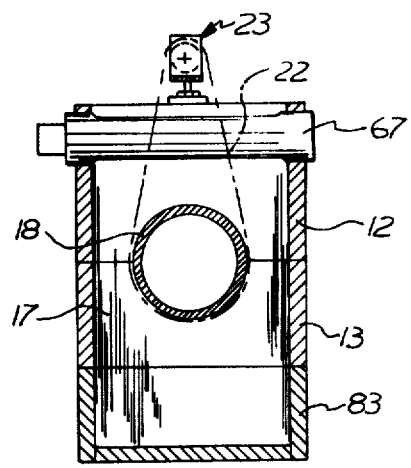

METHOD AND APPARATUS FOR PRENOTCHING A PIPELINE

BACKGROUND OF THE INVENTION

This invention relates to a method and apparatus for gaining access to the interior of a live pipeline, while maintaining confinement of fluid carried in the line.

PRIOR ART

U.S. Pat. Nos. 3,785,041; 3,833,020; 3,863,667; 3,867,964; and 4,177,827, for example, disclose advances in the art of entering a live pipeline for purposes of interrupting or diverting flow with containment of pressurized fluid within the line. Such apparatus provides a double-edged shear arranged to cut into the wall of the pipeline and then progressively sever an axial segment from it. With the sheared wall segment displaced from the pipe, the shear or another body may be utilized to seal off the pipe on at least one side of the point of entry. This shearing operation has many advantages over other known methods, among which are avoidance of chip formation, absence of sparks, and relatively high cutting speed. The formation of chips in a cutting operation with prior art techniques can be a serious disadvantage in many situations where there is a risk that such chips can enter the pipeline once it is penetrated and be carried away into downstream equipment, such as a turbine pump or other expensive equipment despite the provision of strainers and traps, whichj are not completely effective in practice.

Where a pipe is to be sheared to gain access to its interior, it has been known from the aforementioned patents to weld reinforcing rings circumferentially about its exterior to avoid the risk of crushing the pipe when the shear is pressed through it. It has also been suggested in these patents in such situations to render the pipe weaker at the planes of shear by circumferentially scoring the exterior of the pipe at these points.

SUMMARY OF THE INVENTION

The invention involves the preconditioning of the wall of a pipeline to weaken it at desired locations for subsequent shearing operations to gain entry to its interior while it is in service. The preconditioning procedure entails the assembly of a housing around the pipeline, followed by a pipe wall notching operation conducted within the housing. The notching process utilizes a flexible strand cutter looped around the pipeline and manipulated from points external of the housing. With the notching operation performed after installation of the housing, the strength of the housing is available to stabilize the pipeline against mechanical stresses existing in the pipeline and, in the event of an unexpected leak developing as a result of notching operations, is immediately available to contain escaping fluids.

In the preferred embodiment, the flexible strand cutter comprises a power transmission type chain on which are mounted cutter rollers for cutting notches at two shear planes corresponding to the thickness of a shear plate to be subsequently used. The chain is slipped around the pipe and assembled into an endless loop. A takeup unit is mounted on the housing and includes a sprocket drive wheel with which the chain is engaged. The sprocket wheel is rotated to cause the chain-mounted cutting wheel elements to traverse the exterior of the pipe while the takeup unit is adjusted to draw the cutter wheels progressively into the wall of the pipe. When a notch has been formed to a sufficient depth at one side of the pipeline, the takeup unit is repositioned on the housing to notch the opposite side of the pipeline. When the notches have been completed, the chain assembly and takeup unit are removed and a shear assembly is mounted on the housing. The shear, arranged with a pair of cutting edges at its leading side, is aligned with the notches. A power unit, such as a piston and cylinder actuator, is energized to forcibly drive the shear completely through the wall of the pipe to interrupt flow through the pipeline.

An important advantage of the disclosed method and structure of the invention is the simultaneous scoring or notching of the pipe at two planes. Ideally, roller cutters operating in a manner of a conventional pipe cutter, score the pipe at accurately predetermined spacings corresponding to the thickness of the shear plate so that reliable shear action will be achieved.

BRIEF DESCRIPTION OF DRAWINGS

FIG. 2 is a cross-sectional, schematic view, taken through the housing of FIG. 1, in a plane transverse to the longitudinal axis of the pipeline;

FIG. 3 is a cross-sectional view of the housing, taken in a plane parallel to the longitudinal axis of the pipeline, with shear and plugging apparatus installed thereon;

FIG. 5 is a view, partially in section, of a cutter strand takeup device.

DESCRIPTION OF THE PREFERRED EMBODIMENT

Figure 1:
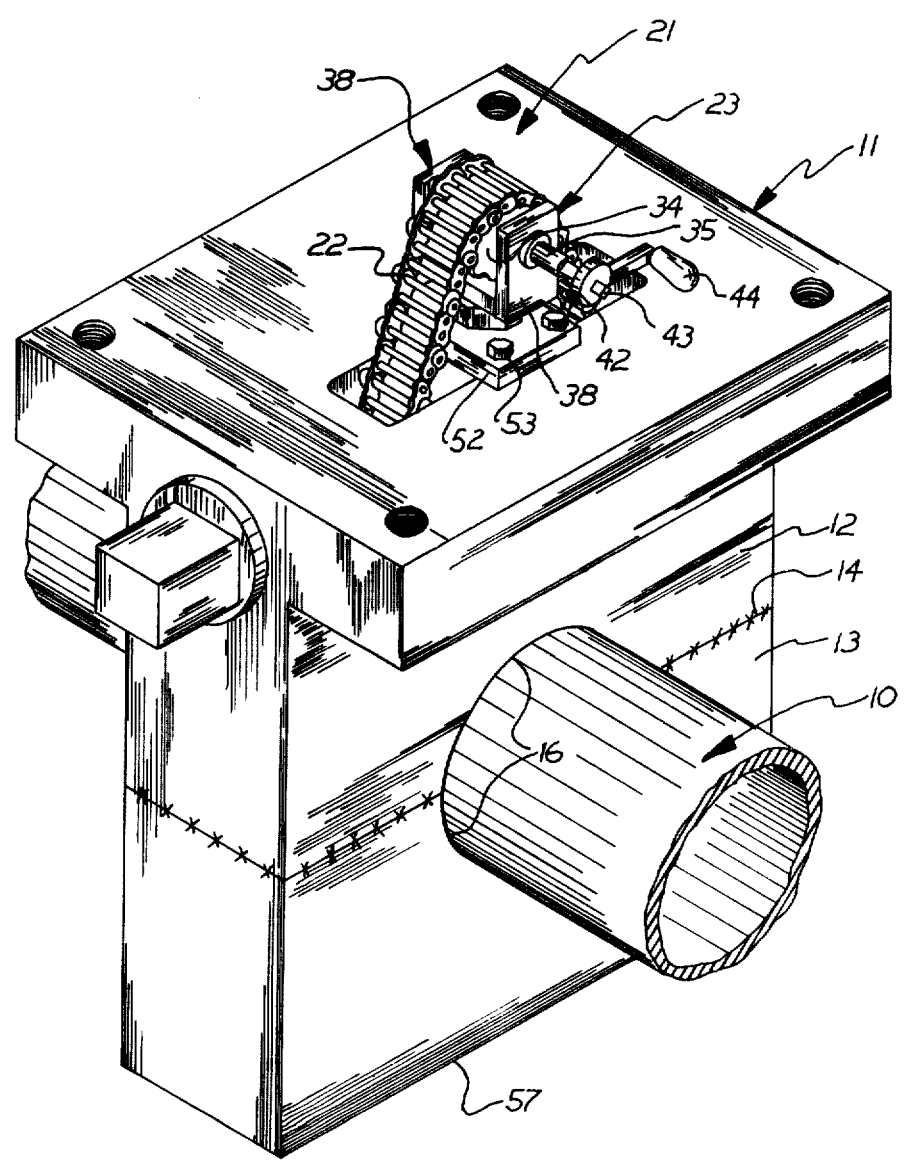
FIG. 1 is a perspective view of a notching apparatus assembled on a housing retrofitted on a pipeline.

Referring now to the drawings, the numeral 10 represents a pipeline in service which is conducting fluid under pressure. It is assumed that access to the interior of the pipeline 10 is desired for purposes of stopping flow or forming a tee connection for a branch circuit or developing a bypass loop for an intermediate length of the pipeline. A housing 11 is retrofitted around the pipeline 10 by assembling it on the pipe at a desired location. The housing 11 can be, for example, a steel weldment fabricated as two complementing saddle sections 12, 13, such as is disclosed in U.S. Pat No. 4,177,827. The saddle sections 12, 13 mate across a diametral plane 14, where they are welded together in the field after installation on the pipeline. Semicircular openings 16 in the saddle sections 12, 13 are provided for encircling the pipeline 10. Where the saddle sections 12, 13 are welded together on the plane 14, the housing 11 is sealed to the pipeline by continuously welding it along these openings 16. Each saddle section 12, 13 is a hollow, rectangular body cooperating with the other to enclose a work chamber 17a which surrounds a relatively short axially extending section 18 of pipe.

Apparatus shown in FIG. 3 and discussed in greater detail below is provided for shearing a relatively short axial segment from the midportion of the enclosed pipe section 18, and thereby providing access to the interior of the pipeline. To facilitate this shearing operation, pipe notching apparatus 21 is provided to precondition the pipeline and render it weaker across planes at each end of the pipe segment to be removed. The apparatus 21, which is preferably mounted on the housing 11 once the latter is installed on the pipeline 10, includes a flexible cutter strand 22 looped around the housing-enclosed pipe section 18 and a takeup unit 23.

In the illustrated case, the strand 22 is principally formed of a conventional power transmission-type chain 26 modified to the extent of carrying cutter wheels or rollers 27 at spaced portions on its length. The spacing of the citter wheels 27 lengthwise of the chain 26, most conveniently, is related to the pitch of the chain so that the wheels are spaced a dimension corresponding to one link or, in the illustrated case, a multiple of one link length. The chain 26 is modified from a commercially available type by removing periodic ones of its pins and substituting hardened steel pins 28 of somewhat greater length than the original pins. The cutter wheels 27 of the general type used on conventional pipe cutters are assembled on these lengthened pins 28 which form axles for the wheels. The cutter wheels 27 are retained on the axle pins 28 by C-washers 29 snapped into suitable grooves 31.

Figure 4:
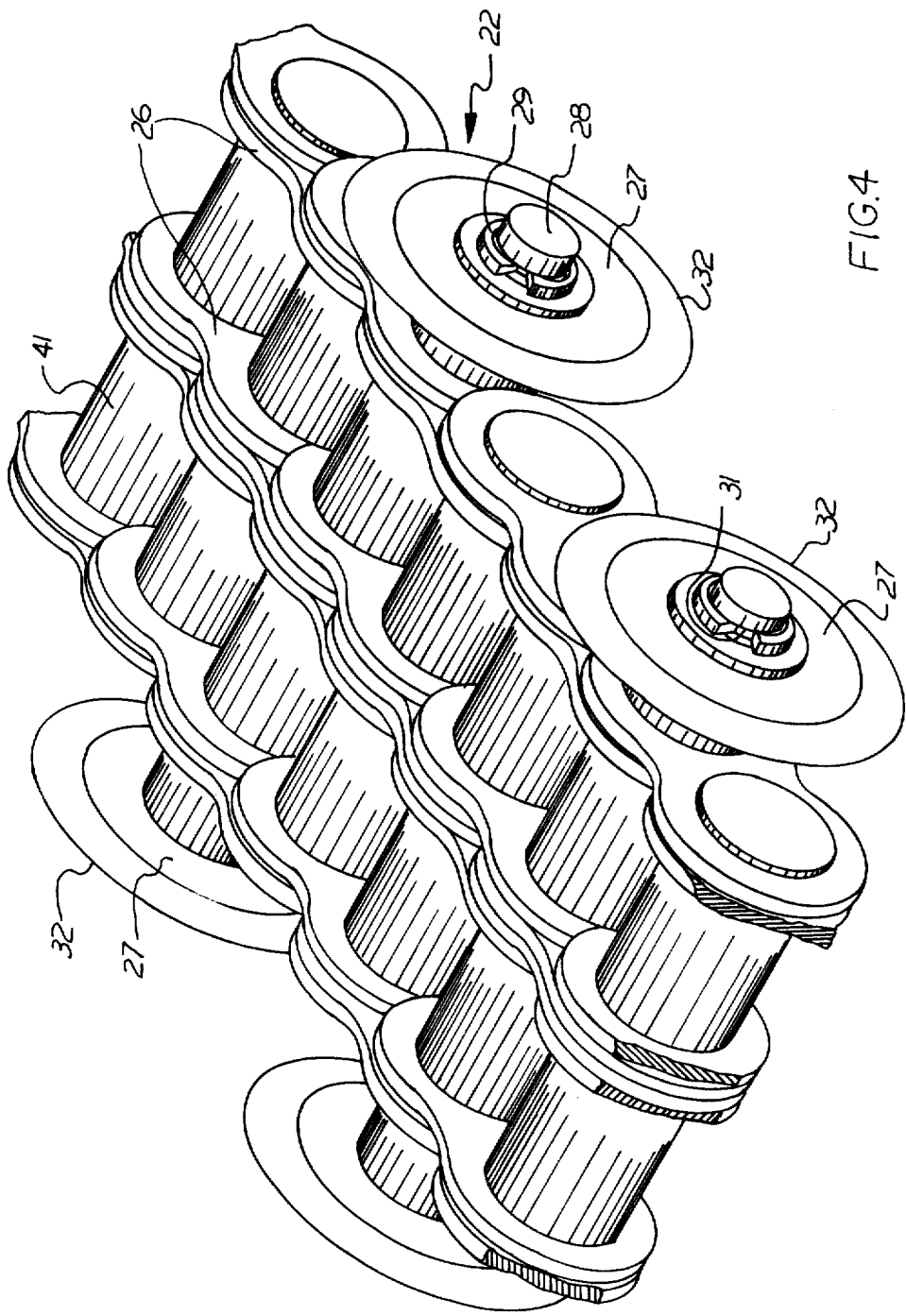
FIG. 4 is an enlarged, perspective, fragmentary view of a preferred form of the flexible cutter strand for forming an endless loop about the pipeline.

As illustrated most clearly in FIG. 4, the wheels 27 are provided in pairs on opposite ends of the axle pins 28 so that their cutting edges 32 are spaced a predetermined distance substantially equal to the axial length of a segment of pipe to be sheared from the pipeline 10.

The pipe notching apparatus 21 includes the takeup unit 23 which, in turn, includes a toothed sprocket wheel 34 fixed on a shaft 35. The shaft 35 is journaled in suitable bearings in opposite legs 37 of a yoke 38. The shaft 35 and sprocket 34 revolve about an axis of rotation parallel to the axis of the pipeline 10. The teeth 39 of the sprocket 34 are drivingly engaged with rollers 41 of the chain 26. The shaft 35 has an extension 42 passing through a yoke leg 37, and includes at its outer end an acircular cross section 43. A crank 44 having an aperture complementary to the acircular section 43 of the sprocket shaft extension 22 is assembled on this extension to permit the shaft 35 to be manually rotated to drive the sprocket 34 in rotation. Alternatively, the shaft 35 may be rotated by a suitable electrically, pneumatically, or hydraulically operated power unit.

The spacing between the axis of rotation of the sprocket 34 and the center of the pipeline 10 is adjustably determined by a threaded shank 46 and a nut 47 threaded on the shank. The shank 46 has one end fixed to a web 48 of the yoke 38 and its opposite end situated in a clearance hole 51 formed in a mounting plate 52. The mounting plate 52 is temporarily secured to a saddle section 12 of the housing 11 by bolts 53 threaded into suitable holes in this saddle section. The mounting plate 52 is positioned on the housing 11 at a point where the sprocket wheel 34 axially registers the chain 26 with the roller cutters 27 at the desired planes. The effective length of the shank 46 of the takeup unit 23 is changed to determine tension in the chain 26 by turning the nut 47 one way or the other to thereby move the yoke 38 and sprocket 34 relative to the housing 11.

The pipe section 18 is weakened at spaced transverse planes corresponding to the spaced pairs of cutter wheels 27. This is accomplished by developing relative movement of the chain 26 over the pipe to cause the wheels 27 to run over the exterior of the pipe section 18. The diameter of the cutting edges 32 of the wheels 27 is greater than the width of the chain links so that these cutting edges project radially inwardly of the chain 26 and freely contact the surface of the pipeline 10. Movement of the chain 26 is generated by rotation of the crank 44 and sprocket 34. As the wheels 27 pass over the exterior of the pipe section 18, rotating on their axle pins 28, they progressively cut into the wall of the pipe in a chipless, particle-free manner analogous to that accomplished by a pipe cutter. Where the crank 44 is operated in a confined space, it need not move through a full revolution but only enough to move the chain 26 at least as far as the spacing between the successive pairs of cutter wheels 27 running in the direction of the length of the chain 26.

As indicated in FIG. 2, the diameter of the sprocket 34 is substantially less than the diameter of the pipe 10, so that the score or notch pattern developed by the cutter wheels 27 about the pipe exceeds an arc of 180 degrees. When the notch cut by the wheels 27 is sufficiently deep (e.g., one-half the thickness), the pipe notching apparatus 21 is removed from the associated saddle section 12 and is similarly positioned on an outer face 57 of the other saddle section 13 and again suitably secured to such saddle section by the bolts 53 which are threaded into appropriate holes provided in such face. To facilitate removal and installation of the takeup unit 23 to or from either housing section 12, 13, a master link or equivalent in the chain 26 may be opened to make room for passage of the takeup unit 23. This same master link expedient is utilized to first assemble the chain around the pipe section 18, preferably after the housing sections 12, 13 are in place. The pipe notching apparatus 21 is mounted on the second section 13, and operates in the same manner as that in which it operated upon the pipe section 18 when secured to the first section 12. Again, the crank 44 is turned to cause the cutter wheels 27 to progressively cut through the wall of the pipe section 18 until sufficient notching of the wall is achieved. The cutter wheels 27 align the strand 22 and themselves with the previously cut portion of the notch with relative ease, since this prior notch portion is in excess of 180 degrees, as mentioned above, and the apparatus 21 is mounted, with reference to the pipeline, at diametrically opposite points on the individual housing sections 12, 13.

With pipe section 18 notched with circumferentially continuous score lines of uniform limited depth, the pipe notching apparatus 21 is removed. Thereafter, the shearing and plugging unit of FIG. 3 is assembled on the housing 11. The shearing and plugging unit, designated 61, can be of the general type disclosed in aforementioned U.S. Pat. No. 4,177,827. The unit includes a shearing and plugging plate 62 which is extendable from and retractable into a fluidtight housing 63 by operation of a power actuator 64 driving the plate through an actuator rod 65. A rotary cock valve 67 is disposed in the saddle section 12 on which the shearing and plugging unit 61 is mounted. The shear and plug plate 62 has a leading face on which are disposed cutting edges 71, 72 spaced axially with reference to the axis of the pipeline 10. The edges 71, 72 are disposed in the planes of the notches previously formed by the cutter wheels 27. From a starting position in which the cutting edges 71, 72 are clear of the pipeline, the shear and plugging plate 62 is caused to progressively shear through the wall of the pipe section under the motive force of the actuator 64. A short segment or coupon 81 of the material is produced as the cutting edges 71, 72 forcibly move diametrally through the pipe section 18.

Any risk of crushing of the adjacent wall area of the pipe section 18 outside of the zone between the planes of the notches is avoided by the existence of the notches, which weaken the wall at the desired areas. Once the shear 62 has passed completely through the pipe section 18 and has expressed the coupon to a receiving cavity 82 formed by a fluidtight cap 83 bolted or welded to the saddle section 13, actuator bolts 86 can be operated to develop a sealing thrust on the plate to cause it to sealingly engage the pipe or an internal surface of the housing surrounding the pipe. Sealant can be injected into the areas of contact between the plugging plate 62 and pipe or housing by way of injection fittings 87.

If desired, the shear and plugging plate 62 can be uncoupled from the actuator rod 65 at a clevis 89 and the housing 63 and actuator 64 can be removed and replaced with a blind flange bolted in place of the housing 63. Similarly, the cap 83 can be removed from the saddle section 13 with the coupon 81 and be replaced with a blind plate.

For many reasons, both economic and structural, it is advantageous that the housing 11 be constructed as small as possible in relation to the size of the pipeline 10. The disclosed flexible strand cutter requires essentially no more space in the housing 11 than that which is required by the shearing and plugging plate 62. Although it is capable of operating in tight quarters within the housing 11, the strand cutter 22 is readily operated manually or with power from a point remote from the interior of the housing 11. The procedure of first notching the pipe with the roller cutters 27 and then shearing the pipe section 18 with a double edge is particularly advantageous since the pipeline 10 is first constrained by the housing 11 before its wall is notched, and thereby weakened. The procedure can be conducted in a spark-hazardous environment without undue risk.

Although the preferred embodiment of this invention has been shown and described, it should be understood that various modifications and rearrangements of the parts may be resorted to without departing from the scope of the invention as disclosed and claimed herein.

What is claimed is:

1. Apparatus for preparing a pipeline to be opened by a transverse shear plate across two axially spaced planes, comprising:
    a fluidtight housing adapted to be secured to the exterior of the pipeline to enclose an axial section of the pipeline and having at least one axial extending closeable opening,
    a flexible strand cutter having a segment adapted to be looped about a portion of the circumference of the pipeline section enclosed by the housing and extending both axially and circumferentially of a portion of the pipeline and having a segment adapted to extend externally of the housing through said axial extending opening,
    means supported on said housing to axially register said flexible strand cutter with the axially spaced planes,
    means to tension said flexible strand cutter against the wall of the pipeline section, and
    operating means external of the housing and engageable with said external strand segment to cause said flexible strand cutter to move circumferentially on the said pipeline section while tensioned against the same to cut a notch into the wall of the pipeline section,
    said flexible strand cutter being removable from said planes to permit the shear plate operating in said housing through said at least one axial extending closeable opening to shear through said pipeline across said shear planes and thereby sever an axial segment from said pipeline,
    the notch formed by said flexible strand cutter reducing the risk of the wall of the pipeline collapsing under the forces developed by said shear.

2. Apparatus as set forth in claim 1, wherein said flexible strand cutter includes axially spaced cutting elements having a spacing equal to the spacing of said spaced planes.

3. Apparatus as set forth in claim 2, wherein said cutting elements are constructed and arranged to notch said pipeline section in a substantially chipless manner.

4. Apparatus as set forth in claim 1, wherein said flexible strand cutter comprises a power transmission type chain wrapped about said pipeline section in an endless loop.

5. Apparatus as set forth in claim 4, wherein said flexible strand cutter includes a pair of roller cutting wheels axially spaced from one another a distance equal to the spacing between said planes.

6. Apparatus as set forth in claim 5, wherein said registering means includes a toothed sprocket wheel, said chain strand cutter being interengaged with the teeth of said sprocket wheel.

7. Apparatus as set forth in claim 6, wherein said strand cutter moving means includes means to rotate said sprocket wheel.

8. Apparatus as set forth in claim 7, wherein said tensioning means includes means to urge said sprocket wheel radially away from said pipeline.

9. A method of prenotching a pipeline in service to facilitate penetration of the pipeline with a shear plate having a pair of cutting edges on its leading face at axially spaced planes, comprising the steps of:
    securing a housing to the exterior of the pipeline capable of containing pressurized fluid existing in the pipeline and providing on the housing at least one axially extending access opening,
    supporting an external removable operator including a sprocket wheel on the housing at the access opening with its axis parallel to the axis of the pipeline,
    circumferentially wrapping the section of pipeline enclosed by the housing and the sprocket with an endless loop of power transmission type chain,
    providing axially spaced cutting wheels on the chain with cutting edges projecting radially inward of the chain,
    tensioning the chain to force the cutting wheels against the circumference of the pipeline section, and
    with the housing previously secured to the pipeline, moving the chain relative to the wall of the pipeline section in a circumferential direction by the operator to cause said cutting wheels to cut into but not through the wall of the pipeline in a chipless manner, and
    removing the chain and cutting wheels from the pipe section to provide clearance for subsequent operation of the shear plate through said at least one access opening.

10. A method as set forth in claim 9, wherein generally diametrically opposite sides of the pipeline section are separately notched, said steps being conducted by moving the sprocket wheel from support on the housing on one side of the pipeline to support on the housing at the other side of the pipeline.

* * * * *